United States Patent [19]

Mafoti et al.

[11] Patent Number: 5,141,967
[45] Date of Patent: Aug. 25, 1992

[54] PROCESS FOR THE PREPARATION OF POLYUREA-POLYURETHANE ELASTOMERS

[75] Inventors: Robson Mafoti, Pittsburgh; Majid Daneshvar, Coraopolis; Robert M. Loring, Library, all of Pa.

[73] Assignee: Miles Inc., Pittsburgh, Pa.

[21] Appl. No.: 701,945

[22] Filed: May 17, 1991

Related U.S. Application Data

[63] Continuation of Ser. No. 386,190, Jul. 28, 1989, abandoned.

[51] Int. Cl.⁵ .............................................. C08G 18/00
[52] U.S. Cl. ..................................... 521/159; 521/163; 521/164; 521/170
[58] Field of Search ...................... 528/64, 26, 28, 29, 528/80, 82; 521/159, 163, 164, 170

[56] References Cited

U.S. PATENT DOCUMENTS

| | | | |
|---|---|---|---|
| 3,428,610 | 2/1969 | Klebert et al. | 260/75 |
| 4,218,543 | 8/1980 | Weber et al. | 521/51 |
| 4,296,212 | 10/1981 | Ewen et al. | 521/163 |
| 4,297,444 | 10/1981 | Dominguez et al. | 521/160 |
| 4,321,333 | 3/1982 | Alberino et al. | 521/159 |
| 4,324,867 | 4/1982 | Patton, Jr. et al. | 521/159 |
| 4,341,875 | 7/1982 | Visger et al. | 521/164 |
| 4,374,210 | 2/1983 | Ewen et al. | 521/159 |
| 4,590,219 | 5/1986 | Nissen et al. | 521/51 |
| 4,607,090 | 8/1986 | Dominguez | 528/68 |
| 4,631,298 | 12/1986 | Presswood | 521/163 |
| 4,683,279 | 7/1987 | Milligan et al. | 528/67 |
| 4,722,989 | 2/1988 | Starner et al. | 528/64 |
| 4,745,223 | 5/1988 | Burgoyne, Jr. et al. | 564/365 |
| 4,816,543 | 3/1989 | Burgoyne, Jr. et al. | 528/64 |
| 4,871,789 | 10/1989 | Martinez | 523/220 |

OTHER PUBLICATIONS

Polyurethane Handbook, Edited by G. Oertel (Hänser Publishers, Munich, Vienna and New York, 1985), pp. 352-326.

*Primary Examiner*—John Kight, III
*Assistant Examiner*—Duc Truong
*Attorney, Agent, or Firm*—Joseph C. Gil

[57] ABSTRACT

The present invention relates to a process for preparing polyurea-polyurethane elastomers comprising reacting in a closed mold, in accordance with the reaction injection molding technique at an isocyanate index of about 95 to about 110, an isocyanate prepolymer having an isocyanate content of about 5 wt. % to 10 wt. % and a molecular weight range of about 1000 to 4000 with a diamine chain extender having no isocyanate-reactive groups other than amino groups in the substantial absence of compounds having isocyanate-reactive groups other than amino groups. The present invention further relates to the polyureapolyurethane elastomers produced by the process of this invention.

20 Claims, No Drawings

PROCESS FOR THE PREPARATION OF POLYUREA-POLYURETHANE ELASTOMERS

This application is a continuation of application Ser. No. 07/386,190 filed Jul. 28, 1989, now abandoned.

BACKGROUND OF THE INVENTION

The present invention relates to a process for preparing polyurea-polyurethane elastomers comprising reacting in a closed mold, in accordance with the reaction injection molding technique, an isocyanate prepolymer having an isocyanate content of about 5 wt. % to 10 wt. % and a molecular weight range of about 1000 to 4000 with a diamine chain extender having no isocyanate-reactive groups other than amino groups in the substantial absence of compounds having isocyanate-reactive groups other than amino groups. The present invention further relates to the polyurea-polyurethane elastomers produced by the process of this invention.

The preparation of elastomers from isocyanate-terminated prepolymers and aromatic amine chain extenders using a casting technique has been described. E.g., U.S. Pat. No. 3,428,610. Such reactions of prepolymers and amines, in which no hydroxyl-group-containing compounds are present after formation of the prepolymer, have not been considered suitable for the reaction injection molding ("RIM") process. Use of the RIM process for the preparation of elastomeric products from a reaction mixture of an isocyanate, a polyhydroxyl compound, and an aromatic amine has been described. E.g., U.S. Pat. No. 4,218,543. When using amine chain extenders in RIM processes, however, at least a portion of the hydroxyl-group-containing compound has heretofore been added along with the amine and, if the isocyanate is a prepolymer, after the formation of prepolymer component is completed.

The use of isocyanate-terminated prepolymers in combination with the same types of amines as described in U.S. Pat. Nos. 3,428,610 and 4,218,543 in a RIM process is also broadly described in the patent literature. See, e.g., U.S. Pat. Nos. 4,296,212, 4,297,444, 4,321,333, and 4,374,210. The use of polyesters in a RIM process is broadly described in U.S. Pat. Nos. 4,590,219 and 4,341,875, while the use of polyester-based prepolymers in a RIM process is broadly described in U.S. Pat. Nos. 4,296.212, 4,297,444, and 4,374,210. U.S. application Ser. No. 238,436, filed on Aug. 30, 1988, describes the use of a neopentyl adipate based prepolymer in a RIM process. Prepolymers and quasi-prepolymers used in the RIM process typically have an NCO content of at least 10% by weight and generally 20% to 40% by weight. See, e.g., U.S. Pat. Nos. 4,631,298 and 4,324,867. None of the above references discloses a process in which a true prepolymer having an isocyanate content of less than about 10% reacts with diamine chain extenders under RIM conditions in the absence of hydroxyl-group-containing compounds. It has now surprisingly been found that prepolymers having an NCO content of only about 4% to about 10% by weight can be used advantageously in a RIM process using diamine chain extenders in the absence of hydroxyl-group-containing compounds.

SUMMARY OF THE INVENTION

The present invention relates to a process for the preparation of polyurea-polyurethane elastomers comprising reacting in a closed mold in accordance with the reaction injection molding technique at an isocyanate index of about 95 to about 110

(a) an isocyanate prepolymer having an isocyanate content of about 4 wt. % to about 10 wt. % and having a molecular weight range of about 1000 to about 4000, wherein said isocyanate prepolymer is a reaction product of
  (i) at least one organic polyisocyanate with
  (ii) at least one hydroxyl-group-containing compound having a molecular weight range of about 750 to about 3500, wherein said hydroxyl-group-containing compound contains (A) at least two hydroxyl groups or (B) at least one hydroxyl group and at least one primary or secondary amino group; with (b) at least one diamine chain extender having no isocyanate-reactive groups other than amino groups, in the substantial absence of compounds having isocyanate-reactive groups other than amino groups.

The present invention further relates to the polyurea-polyurethane elastomers produced by the process of this invention.

DESCRIPTION OF THE INVENTION

The process of the present invention is useful for preparing elastomeric polyurea-polyurethanes having excellent physical properties over a wide temperature range. The elastomeric products can be used at relatively high temperatures, as evidenced by dynamic mechanical spectroscopy. Dynamic mechanical spectroscopy involves the determination of the dynamic mechanical properties of polymers. As a result of the analysis, the relationships among the dynamic properties, the structural parameters (e.g., crystallinity, molecular orientation, molecular weight, copolymerization, crosslinking and plasticization), and external variables (e.g., temperature, pressure, type of deformation, atmosphere and humidity) can be explained. Polymeric properties are temperature dependent. Plastics are hard and rigid at room temperature (i.e.. about 22° C.) but become softer at high temperatures (e.g., about 150° C.). Similarly, rubbers are elastic and soft at room temperature, but become harder at low temperatures (e.g., about −75° C.). This hardness or stiffness is measured as a modulus, a ratio of stress to strain at a certain stage of deformation. Further details relative to dynamic mechanical spectroscopy can be found in "Dynamic Mechanical Analysis of Polymeric Material", T. Murayama, Elsevier Scientific Publishing Co., New York, 1978.

Polyurea-polyurethane elastomers can be prepared according to the present invention by the reaction using the RIM method of the above-identified prepolymer with an aromatic diamine chain extender or with both an aromatic diamine chain extender and an amine terminated polyether.

Preparation of the prepolymer component of the present invention requires an isocyanate selected from organic diisocyanates or higher functionality polyisocyanates known in the art. Such isocyanates may be aromatic, aliphatic, cycloaliphatic, or heterocyclic isocyanates, such as, for example, those described by Siefken in *Justus Liebigs Annalen der Chemie*, 562, pages 75–136. Preferred isocyanates used in the preparation of the prepolymer component include methylene bis(phenylisocyanate), polymethylene poly(phenylisocyanate), including various phenyl-substituted derivatives and isomeric mixtures thereof, as well as mixtures of such isocyanates. Methylene bis(phenylisocyanate) includes the 2,2'-isomer, the 2,4'-isomer, the 4,4'-isomer, and mixtures thereof, with the 4,4'-isomer being preferred. Suitable polymethylene poly(phenyisocyanates) are generally known compounds produced by the reaction of phosgene with aniline-formaldehyde condensates. Known processes for preparing the aniline-formaldehyde condensates and the resultant polyisocyanates are described in the literature and in many patents, including, for example, U.S. Pat. Nos. 2,683,730, 2,950,263, 3,012,008, 3,344,162, and 3,362,979. Suitable, but less preferred, isocyanates used in the preparation of the prepolymer component include tolylene diisocyanate and naphthalene diisocyanate.

Suitable hydroxyl-group-containing compounds are those conventionally used in polyurethane chemistry, including as hydroxyl-containing polyethers, polyesters, polyacetals, polycarbonates, polyesterethers, polythioethers, polyamides, polyesteramides, polysiloxanes, polybutadienes, and polyacetones, and can optionally contain one or more isocyanate-reactive amino groups. Suitable hydroxyl-group-containing compounds have average molecular weights in the range of about 750 to about 3500 (preferably about 1000 to about 3000) and contain 2 to 3 reactive hydroxyl groups or, less preferably, 1 to 3 reactive hydroxyl groups and 1 to 3 reactive primary or secondary amino groups. Particularly preferred hydroxyl-group-containing compounds include polyethers or polyesters having 2 to 3, preferably 2, isocyanate-reactive hydroxyl groups.

Suitable hydroxyl-group-containing polyethers are known and may be prepared, for example, by the polymerization of epoxides such as ethylene oxide, propylene oxide, butylene oxide, tetrahydrofuran, styrene oxide, or epichlorohydrin, optionally in the presence of $BF_3$, or by chemical addition of such epoxides, optionally as mixtures or successively, to starting components containing reactive hydrogen atoms, such as water, alcohols, or amines. Examples of such starting components include ethylene glycol, 1,3- or 1,2-propanediol, 1,2-, 1,3-, or 1,4-butanediol, trimethylolpropane, 4,4'-dihydroxydiphenylpropane, aniline, ammonia, ethanolamine, or ethylene diamine. Sucrose polyethers of the type described, for example, in German Auslegeschriften 1,176,358 and 1,064,938 may also be used according to the invention. Polyethers which contain predominantly primary hydroxyl groups (up to about 90% by weight, based on all of the hydroxyl groups in the polyether) are also often preferred. Polyethers modified by vinyl polymers of the kind obtained, for example, by the polymerization of styrene and acrylonitrile in the presence of polyethers (e.g., U.S. Pat. Nos. 3,383,351, 3,304,273, 3,523,093, and 3,110,695 and German Patent 1,152,536) are also suitable, as are polybutadienes containing hydroxyl groups. Particularly preferred polyethers include polyoxyalkylene polyether polyols, such as polyoxyethylene diol, polyoxypropylene diol, polyoxybutylene diol, and polytetramethylene diol.

Suitable hydroxyl-group-containing polyesters include reaction products of polyhydric alcohols (preferably diols), optionally with the addition of trihydric alcohols, and polybasic (preferably dibasic) carboxylic acids. Instead of free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic, or heterocyclic and may be substituted, e.g. by halogen atoms, and/or unsaturated. Suitable polycarboxylic acids include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, dimethyl terephthalic, and terephthalic acid bisglycol esters. Suitable polyhydric alcohols include ethylene glycol, 1,2- and 1,3-propanediol, 1,4- and 2,3-butane diol, 1,6-hexanediol, 1,8-octanediol, neopentyl glycol, cyclohexanedimethanol, 1,4-bis(hydroxymethyl)cyclohexane, 2-methyl-1,3-propanediol, glycerol, trimethylolpropane, 1,2,6-hexanetriol, 1,2,4-butanetriol, trimethylolethane, pentaerythritol, quinitol, mannitol, sorbitol, methyl glycoside, diethylene glycols, triethylene glycol, tetraethylene glycol, polyethylene glycols, dipropylene glycol, polypropylene glycols, dibutylene glycol, and polybutylene glycols. The polyesters may also contain a proportion of carboxyl end groups. Polyesters of lactones, such as epsilon-caprolactone, or of hydroxycarboxylic acids, such as omega-hydroxycaproic acid, may also be used. Hydrolytically stable polyesters are preferably used in order to obtain the greatest benefit relative to the hydrolytic stability of the final product. Preferred polyesters include polyesters obtained from adipic acid or isophthalic acid and straight chained or branched diols, as well as lactone polyesters, preferably those based on caprolactone and diols.

Suitable polyacetals include compounds obtained from the condensation of glycols, such as diethylene glycol, triethylene glycol, 4,4'-dihydroxydiphenylmethane, and hexanediol, with formaldehyde or by the polymerization of cyclic acetals, such as trioxane.

Suitable polycarbonates include those prepared by the reaction of diols, such as 1,3-propanediol, 1,4-butanediol, 1,6-hexanediol, diethylene glycol, triethylene glycol, tetraethylene glycol, or thiodiglycol, with phosgene or diarylcarbonates such as diphenylcarbonate (DE-B 1,694,080, 1,915,908 and 2,221,751; DE-A 2,605,024).

Suitable polythioethers include the condensation products obtained by the reaction of thiodiglycol, either alone or with other glycols, dicarboxylic acids, formaldehyde, aminocarboxylic acids, or amino alcohols. The products obtained are polythio-mixed ethers, polythioether esters, or polythioether ester amides, depending on the components used.

Suitable polyester amides and polyamides include, for example, the predominantly linear condensates prepared from polybasic saturated and unsaturated carboxylic acids or the anhydrides thereof and polyvalent saturated or unsaturated amino alcohols, diamines, polyamines, and mixtures thereof.

Other suitable hydroxyl-group-containing compounds include polyhydroxyl compounds already containing urethane or urea groups and modified or unmodified natural polyols. Products of addition of alkylene oxides to phenol-formaldehyde resins or to urea-formaldehyde resins are also suitable. Furthermore, amide groups may be introduced into the polyhydroxyl compounds as described, for example, in DE-A 2,559,372.

Polyhydroxyl compounds in which polyadducts or polycondensates or polymers are present in a finely dispersed or dissolved form may also be used according to the invention, provided that the molecular weights range from about 750 to about 3500. Polyhydroxyl compounds of this type may be obtained, for example, by carrying out polyaddition reactions (e.g., reactions between polyisocyanates and amino functional compounds) or polycondensation reactions (e.g., between formaldehyde and phenols or amines) in situ in the above-mentioned hydroxyl-group-containing compounds. Processes of this type are described, for example, in DE-B 1,168,075 and 1,260,142 and DE-A 2,324,134, 2,423,984, 2,512,385, 2,513,815, 2,550,796, 2,550,797, 2,550,833, 2,550,862, 2,633,293, and 2,639,254. Suitable compounds may also be obtained according to U.S. Pat. Nos. 3,869,413 or 2,550,860 by mixing a previously prepared aqueous polymer dispersion with a polyhydroxyl compound and then removing water from the mixture.

Polyhydroxyl compounds modified with vinyl polymers, such as those obtained, for example, by the polymerization of styrene and acrylonitrile in the presence of polycarbonate polyols (DE-PS 1,769,795 and U.S. Pat. No. 3,637,909) are also suitable for the preparation of prepolymers suitable for the process of the invention. Synthetic resins with exceptional flame resistance may be obtained by using polyether polyols which have been modified by graft polymerization with vinyl phosphonic acid esters and optionally (meth)acrylonitrile, (meth)acrylamide, or hydroxy-functionalized (meth)acrylic acid esters according to DE-A 2,442,101, 2,644,922, and 2,646,141.

Suitable, although less preferred, hydroxyl-group-containing compounds include organofunctional polysiloxanes containing two terminal isocyanate-reactive groups and structural units of the formula —O—Si(R)$_3$ in which R denotes a $C_1$-$C_4$ alkyl group or a phenyl group, preferably a methyl group. Both the known, pure polysiloxanes containing organofunctional end groups and the known siloxane polyoxyalkylene copolymers containing organofunctional end groups are suitable starting materials according to the invention.

Also suitable are so-called amine terminated polyethers containing primary or secondary (preferably primary) aromatically or aliphatically (preferably aliphatically) bound amino groups. Compounds containing amino end groups can also be attached to the polyether chain through urethane or ester groups. These amine terminated polyethers can be prepared by any of several methods known in the art. For example, amine terminated polyethers can be prepared from polyhydroxyl polyethers (e.g., polypropylene glycol ethers) by a reaction with ammonia in the presence of Raney nickel and hydrogen (Belgian Patent No. 634,741). Polyoxyalkylene polyamines can be prepared by a reaction of the corresponding polyol with ammonia and hydrogen in the presence of a nickel, copper, chromium catalyst (U.S. Pat. No. 3,654,370). The preparation of polyethers containing amino end groups by the hydrogenation of cyanoethylated polyoxypropylene ethers is described in German Patent 1,193,671. Other methods for the preparation of polyoxyalkylene (polyether) amines are described in U.S. Pat. Nos. 3,155,728 and 3,236,895 and in French Patent No. 1,551,605. French Patent No. 1,466,708 discloses the preparation of polyethers containing secondary amino end groups. Also useful are the polyether polyamines described in U.S. Pat. Nos. 4,396,729, 4,433,067, 4,444,910, and 4,530,941.

Relatively high molecular weight polyhydroxypolyethers suitable for the process of the present invention may be converted into the corresponding anthranilic acid esters by reaction with isoatoic acid anhydride. Methods for making polyethers containing aromatic amino end groups are disclosed in German Offenlegungsschriften 2,019,432 and 2,619,840 and U.S. Pat. Nos. 3,808,250, 3,975,428, and 4,016,143. Relatively high molecular weight compounds containing amino end groups may also be obtained according to German Offenlegungsschrift 2,546,536 or U.S. Pat. No. 3,865,791 by reacting isocyanate prepolymers based on polyhydroxyl polyethers with hydroxyl-containing enamines, aldimines, or ketimines and hydrolyzing the reaction product.

Aminopolyethers obtained by the hydrolysis of compounds containing isocyanate end groups are preferred amine terminated polyethers. For example, in a process disclosed in German Offenlegungsschrift 2,948,419, polyethers containing hydroxyl groups (preferably two or three hydroxyl groups) react with polyisocyanates to form isocyanate prepolymers whose isocyanate groups are then hydrolyzed in a second step to amino groups. Preferred amine terminated polyethers are prepared by hydrolyzing an isocyanate compound having an isocyanate group content of from 0.5 to 40% by weight. The most preferred polyethers are prepared by first reacting a polyether containing two to four hydroxyl groups with an excess of an aromatic polyisocyanate to form an isocyanate terminated prepolymer and then converting the isocyanate groups to amino groups by hydrolysis. Processes for the production of useful amine terminated polyethers using isocyanate hydrolysis techniques are described in U.S. Pat. Nos. 4,386,218, 4,456,730, 4,472,568, 4,501,873, 4,515,923, 4,525,534, 4,540,720, 4,578,500, and 4,565,645; European Patent 097,299; and German Offenlegungsschrift 2,948,419, all the disclosures of which are herein incorporated by reference. Similar products are also described in U.S. Pat. Nos. 4,506,039, 4,525,590, 4,532,266, and 4,532,317 and in U.S. application Ser. Nos. 437,641 (filed Oct. 19, 1982), 778,656 (filed Sep. 23, 1985), 895,629 (filed Aug. 11, 1986), 908,535 (filed Sep. 16, 1986), and 916,923 (filed Oct. 9, 1986).

The amine terminated polyethers used in the present invention are in many cases mixtures with any of the abovementioned compounds. These mixtures generally should contain (on a statistical average) two to three isocyanate reactive amino end groups.

General discussions of representative hydroxyl-group-containing compounds that may be used according to the present invention can be found, for example, in *Polyurethanes, Chemistry and Technology* by Saunders-Frish, Interscience Publishers, New York, London, Volume I, 1962, pages 32–42 and pages 44–54, and Volume II, 1964, pages 5–6 and 198–199, and in *Kunststoff-Handbuch*, Volume VII, Vieweg-Hochtlen, Carl-Hanser-Verlag, Munich, 1966, on pages 45 to 71.

The prepolymers are prepared by reacting the isocyanate with the hydroxyl-group-containing compounds under conditions such that essentially no hydroxyl compound remains unreacted, thereby allowing the reaction of the prepolymer with aromatic diamine to take place in the virtual absence of unreacted hydroxyl-group-containing compounds. Temperatures of from about 25° C. to about 125° C. are preferred. The resultant prepolymer has an isocyanate group content of from about 4% to about 10% by weight, preferably from about 5% to about 9% by weight.

The isocyanate prepolymer used in the process of the present invention can be reacted in a mold via the RIM technique with a diamine chain extender or, less preferably, with both a diamine chain extender and an amine terminated polyether. Suitable chain extenders and an amine terminated polyether. Suitable chain extenders are aromatic, aliphatic, or cycloaliphatic compounds containing amino groups but no other isocyanate-reactive groups. Preferred diamine chain extenders are aromatic diamine chain extenders. Preferred aromatic diamine chain extenders generally have molecular weights of from about 108 to about 400 and preferably contain exclusively aromatically bound primary or secondary (preferably primary) amino groups. More preferred aromatic diamines have alkyl substituents in at least one position ortho to the amino groups. The most preferred aromatic diamines have at least one $C_1$-$C_3$ alkyl substituent located ortho to one of the amino groups and two $C_1$-$C_3$ alkyl substituents located ortho to the other amino group. Particularly preferred aromatic diamines have an ethyl, propyl, and/or isopropyl substituent in at least one such ortho position, with methyl substituents optionally present in other ortho positions. Mixtures of such aromatic diamines are, of course, also suitable. Preferred aromatic diamines include 2,4-diaminomesitylene, 1,3,5-triethyl-2,4-diaminobenzene, 1,3,5-triisopropyl-2,4-diaminobenzene, 1-methyl-3,5-diethyl-2,4-diaminobenzene, 1-methyl-3,5-diethyl-2,6-diaminobenzene, 4,6-dimethyl-2-ethyl-1,3-diaminobenzene, 3,5,3′,5′-tetraethyl-4,4-diaminodiphenylmethane, 3,5,3′,5′-tetraisopropyl-4,4′-diaminodiphenylmethane, and 3,5-diethyl-3′,5′-diisopropyl-4,4-diaminodiphenylmethane. Other suitable but less preferred diamines include 1,4-diaminobenzene, 2,4-diaminotoluene, 2,4′- or 4,4′-diaminodiphenylmethane, 3,3′-dimethyl-4,4′-diaminodiphenylmethane, 4,4′-diaminodiphenyl propane-(2,2), t-butyl toluene diamine, 1-methyl-3,5-bis(methylthio)-2,4- or -2,6-diaminobenzene, and mixtures of such diamines. Particularly preferred diamines include 1-methyl-3,5-diethyl-2,4-diaminobenzene, either alone or as a mixture with 1-methyl-3,5-diethyl-2,6-diaminobenzene.

Suitable, but less preferred, diamine chain extenders include those aliphatic or cycloaliphatic diamines for which the rate of reaction with the prepolymer component is not so fast as to prevent their use in a RIM process. Such aliphatic or cycloaliphatic diamines are typically sterically crowded in the vicinity of each amino group.

Although the reaction of diamine chain extenders with the prepolymers is preferably performed in the absence of other reactive components, it is possible to use mixtures of such chain extenders with certain amine terminated polyethers. Suitable amine terminated polyethers can include those described above for the preparation of the prepolymer component but must contain essentially no hydroxyl groups or other isocyanate reactive groups other than amino groups. Preferred amine terminated polyethers generally contain at least two aromatically or aliphatically bound isocyanate reactive amino groups at terminal positions. The average molecular weight (calculated from the functionality and the isocyanate reactive group content) of such polyethers ranges from about 1800 to about 12,000, preferably from 2000 to 8000. The amine terminated polyethers used in the present invention are in many cases mixtures. These mixtures generally should contain (on a statistical average) two to three isocyanate reactive amino end groups. When such polyether mixtures are used, individual components of the mixture may have a molecular weight below 1800 (for example between 500 and 1800) as long as the average molecular weight of the mixture is within the range of 1800 to 12,000. The use of such mixtures in which individual components have a molecular weight below 1800 is, however, not preferred.

In addition to the components noted above, various auxiliaries and additives may be added. However, once the prepolymer component is prepared by reaction of an isocyanate with a hydroxyl-group-containing compound, all subsequent reactions are performed in the substantial absence of any compounds having isocyanate-reactive groups other than amino groups.

The use of additional components is not preferred, but when used, such components may provide certain processing or other advantages. For example, although the so-called external mold release agents are normally preferred, known internal mold release agents may also be used to produce molded articles which have excellent mold release characteristics. External mold release agents are among the auxiliary agents which may advantageously be used in the process of the present invention. In principle, any mold release agent known in the art may be used in the present invention but external mold release agents, such as silicone-based external mold release agents, are preferred.

When used at all, internal mold release agents such as those described, for example, in German Offenlegungsschrift No. 1,953,637 (U.S. Pat. No. 3,726,952), German Offenlegungsschrift 2,121,670 (British Patent 3,365,215), German Offenlegungsschrift 2,431,968 (U.S. Pat. No. 4,098,731) or in German Offenlegungsschrift 2,404,310 (U.S. Pat. No. 4,058,492) are preferred. Preferred mold release agents include the salts (containing at least 25 aliphatic carbon atoms) of fatty acids having at least 12 aliphatic carbon atoms and primary mono-, di-, or polyamines containing two or more carbon atoms or amines containing amide or ester groups and having at least one primary, secondary or tertiary amino groups; other salts of carboxylic acids and tertiary amines; esters of mono- or polyfunctional carboxylic acids and polyfunctional alcohols containing saturated or unsaturated carboxyl or hydroxyl groups and having hydroxyl or acid numbers of at least five; ester type reaction products of ricinoleic acid and long chained fatty acids; and natural or synthetic oils, fats, or waxes. A particularly preferred mold release agent includes the oleic acid or tall oil fatty acid salts of the amide-containing amine obtained by the reaction of N-dimethylaminopropylamine with oleic acid or tall oil fatty acid.

Other mold release agents known in the art may in principle be used, either alone or in a mixture with the preferred mold release agents. Additional mold release agents include, for example, the reaction products of fatty acid esters with polyisocyanates (according to German Offenlegungsschrift 2,319,648); the reaction products of polysiloxanes containing reactive hydrogen atoms with mono- or polyisocyanates (according to German Offenlegungsschrift 2,356,692 (equivalent to U.S. Pat. No. 4,033,912)); esters of mono- or polycarboxylic acids and polysiloxanes containing hydroxy methyl groups (according to German Offenlegungsschrift 2,363,452 (equivalent to U.S. Pat. No. 4,024,090));

and salts of polysiloxanes containing amino groups and fatty acids (according to German Offenlegungsschrift 2,417,272 or German Offenlegungsschrift 2,431,968 (equivalent to U.S. Pat. No. 4,098,731)). Also preferred are the zinc salts, such as zinc stearate, described in U.S. Pat. Nos. 4,581,386 and 4,519,965. If an internal mold release agent is used, it is generally used in an amount which totals from 0.1 to 25 wt. %, preferably 1 to 10 wt. % of the whole reaction mixture.

In the preferred embodiments of the invention, no catalyst is required for the reaction between isocyanate groups and isocyanate reactive groups of the reactants. However, catalysts known and commonly used in the production of polyurethane foams and microcellular elastomers are included in the group of auxiliary agents and additives appropriate to the present invention.

Suitable catalysts include tertiary amines such as triethylamine, tributylamine, N-methylmorpholine, N-ethylmorpholine, N-cocomorpholine, N,N,N',N'-tetramethylenediamine, 1,4-diazabicyclo[2.2.2]octane, N-methyl-N'-dimethylaminoethylpiperazine, N,N'-dimethylbenzylamine, bis(N,N-diethylaminoethyl) adipate, N,N,-diethylbenzylamine, pentamethyl diethylene triamine, N,N-dimethylcyclohexylamine, N,N,N',N'-tetramethyl-1,3-butanediamine, 1,2-dimethylimidazole and 2-methylimidazole.

Organometallic catalysts may also be used in the process of the present invention. Particularly useful organometallic catalysts include organic tin catalysts such as tin(II) salts of carboxylic acids (e.g., tin(II) acetate, tin(II) octoate, tin(II) ethylhexoate and tin(II) laurate) and the dialkyl tin salts of carboxylic acids, (e.g., dibutyltin diacetate, dibutyltin dilaurate, dibutyltin maleate or dioctyltin diacetate), either alone or in combination with tertiary amines. Other suitable catalysts and details concerning the action of these catalysts are given in Kunststoff Handbuch, Volume VII, published by Vieweg and Hochtlen, Carl Hanser Verlag, Munich 1966, e.g., on pages 96 to 102.

If a catalyst is used, quantities of about 0.001 to 10 wt. %, preferably 0.03 to 1 wt. % based on component (i)) are appropriate.

The products of the process of the present invention are preferably compact molded articles. However, blowing agents may be used to produce molded articles having a compact surface and a cellular interior. The blowing agents used may be water, readily volatile organic substances, dissolved inert gases, or mixtures thereof. Suitable organic blowing agents include acetone; ethyl acetate; methanol; ethanol; halogen-substituted alkanes, such as methylene chloride, chloroform, ethylidene chloride, vinylidene chloride, monofluorotrichloromethane, chlorodifluoromethane, and dichlorodifluoromethane; relatively low-boiling alkanes, such as butane, hexane, and heptane; and diethyl ether. Suitable inert gas blowing agents include nitrogen, air, and carbon dioxide. The effect of a blowing agent may also be obtained by the addition of compounds which decompose at temperatures above room temperature to release gases, for example, nitrogen. Azo compounds such as azoisobutyric acid nitrile are examples of such compounds. Other examples of blowing agents and details concerning the use of blowing agents may be found in Kunststoff Handbuch, Volume VII, published by Vieweg and Hochtlen, Carl Hanser Verlag, Munich 1966, e.g. on pages 108 and 109, 453 to 455 and 507 to 510.

Surface active additives (emulsifiers and foam stabilizers) may also be used as reaction mixture components in the process of the invention. Suitable emulsifiers include the sodium salts of ricinoleic sulfonates or of fatty acids or various salts of fatty acids and amines, such as oleic acid diethylamine or stearic acid diethanolamine. Alkali metal or ammonium salts of sulfonic acids (e.g., of dodecyl benzene sulfonic acid or of dinaphthyl methane disulfonic acid) or of fatty acids such as ricinoleic acid or of polymeric fatty acids may also be used as surface active additives. If foam stabilizers are used, it is preferred that they be water soluble polyether siloxanes. These compounds are generally copolymers of ethylene oxide and propylene oxide linked to a polydimethyl siloxane group. Foam stabilizers of this type are described in U.S. Pat. No. 2,764,565.

Other auxiliary agents and additives which may optionally be used in the process of the present invention include known cell regulators, such as paraffins or fatty alcohols or dimethyl polysiloxanes; known pigments or dyes; flame retarding agents, such as tris-chloroethyl phosphate and ammonium phosphate or polyphosphate; stabilizers against aging and weathering; plasticizers; fungistatic and bacteriostatic substances; and fillers, such as barium sulfate, glass fibers, kieselguhr, and whiting.

Other examples of suitable surface active additives and foam stabilizers, flame retardants, plasticizers, dyes, fillers, and fungistatic and bacteriostatic substances, as well as details concerning the use and mode of action of these additives, may be found in Kunststoff Handbuch, Volume VII, published by Vieweg and Hochtlen, Carl Hanser Verlag, Munich 1966, e.g., on pages 103 to 113.

When carrying out the process of the present invention, the quantity of prepolymer should preferably be such that the isocyanate index is from 70 to 130, most preferably 90 to 110 in the reaction mixture. By "isocyanate index" is meant the quotient of the number of isocyanate groups divided by the number of isocyanate-reactive groups, multiplied by 100. When calculating the isocyanate index, any isocyanate-reactive groups possibly present in the mold release agents (e.g., carboxyl groups) are not taken into account.

The process of the present invention is carried out by the known reaction injection molding technique, or RIM process. Two streams are generally employed in this molding technique. In the present invention, the prepolymer is the first stream and the diamine chain extender makes up the second stream. If any auxiliary agents or additives are used, they are generally mixed with the chain extender. However, it may be advantageous, for example, when using a mold release agent containing isocyanate groups, to incorporate the release agent with the prepolymer before the RIM process is carried out. It is possible in principle to use mixing heads in which three or four separate components may be simultaneously introduced so that no preliminary mixing of the individual components is required. The quantity of reaction mixture introduced into the mold is generally calculated to produce molded articles having a density of from about 0.8 to about 1.4 g/cm$^3$, preferably from 0.9 to 1.2 g/cm$^3$. When mineral fillers are used, however, the molded articles may have a density above 1.2 g/cm$^3$. The articles may be removed from the mold after a period of from about 5 to about 90 seconds, preferably from 20 to 60 seconds. The reactant mixture is generally introduced into the mold at a starting temperature of from about 10° to about 60° C., preferably from 20° to 50° C. The temperature of the mold itself is generally from about 40° to about 100° C., preferably from 50° to 70° C.

The molded articles prepared according to this invention have surprisingly good elastomeric properties despite being made by a direct reaction of low-isocyanate prepolymers with diamine chain extenders in the absence of hydroxyl-group-containing compounds or other non-amine components. Prepolymers having an isocyanate content greater than about 10% are unsuitable for RIM processing under such conditions because of the brittleness of the products. Prepolymers having an isocyanate content less than about 4% are also unsuitable for RIM processing with diamine chain extenders because the materials are extremely difficult to process or cannot be processed at all in available RIM machines.

The molded articles obtainable by the process of the invention are particularly suitable for the manufacture of flexible automobile bumpers or car body parts, as well as hoses, fan belts, and the like. The process of the invention is particularly suitable for producing parts for high temperature applications. Appropriate variations of the starting components also makes it possible to manufacture other goods, such as flexible shoe soles with good abrasion resistance and excellent mechanical strength.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

DESCRIPTION OF THE PREFERRED EMBODIMENTS

The following isocyanate prepolymers were used in the examples:

Prepolymer A: Reaction product of 4,4'-methylene bis(phenylisocyanate) with 2900 molecular weight polytetramethylene diol having an NCO content of 8.8%

Prepolymer B: Reaction product of 4,4'-methylene bis(phenylisocyanate) with 2000 molecular weight polytetramethylene diol having an NCO content of 5.76%

Prepolymer C: Reaction product of 4,4'-methylene bis(phenylisocyanate) with 2000 molecular weight polytetramethylene diol having an NCO content of 9.5%

Prepolymer D: Reaction product of 4,4'-methylene bis(phenylisocyanate) with poly(ethylene/butylene) adipate diol having an NCO content of 9.25% (diol is available as Desmophen 2001K from Bayer AG)

Prepolymer E: Reaction product of 4,4'-methylene bis(phenylisocyanate) with 1000 molecular weight polybutylene adipate diol having an NCO content of 8.1%

Prepolymer F: Reaction product of 4,4'-methylene bis(phenylisocyanate) with 1000 molecular weight polypropylene diol having an NCO content of 9.22%

Prepolymer G: Reaction product of 4,4'-methylene bis(phenylisocyanate) with 2000 molecular weight polyethylene adipate diol having an NCO content of 6.57%

Prepolymer H (Comparison): Reaction product of 4,4'-methylene bis(phenylisocyanate) with 2000 molecular weight polyethylene adipate diol having an NCO content of 14.6%

The diamine chain extender was a mixture of 1-methyl3,5-diethyl-2,4-and -2,6-diaminobenzene (referred to as "DETDA").

EXAMPLES 1-7

Preparation of Polyurethane Panels

RIM plaques were prepared using a laboratory piston metering unit and clamping unit. The metering unit was a two-component instrument having a maximum metering capacity of 0.6 liters.

Before making the test panels, the flowability characteristics of the test systems was determined using the servodyne activity method to assure optimal machine processing. The servodyne is used to measure the time between mixing the reactive components and formation of a completely solid polymer. It is known that a system having a servodyne activity of about 1.5 seconds will provide excellent processing. In the systems illustrated in the following examples, the ideal servodyne activity ranged from about 2 to about 4 seconds.

A rectangular mold measuring 300 mm × 200 mm × 3 mm was used to mold the samples under the following conditions:

| | |
|---|---|
| Prepolymer temperature | 90° C. |
| Chain extender temperature | 50° C. |
| Isocyanate index | 105 |
| Mold temperature | 65° C. |
| Demold time | 45 seconds |

The mold was sprayed with MR 515 external mold release agent (available from Chem-Trend).

The materials processed well and the panels exhibited excellent green strength at demold. All samples were post-cured.

The thermomechanical properties of the polyurethane panels prepared in Examples 1-7 were determined by thermal mechanical analysis ("TMA"). In the TMA technique, the penetration of the sample by a probe as a function of temperature is measured. A Perkin-Elmer TMS-2 instrument fitted with a hemispherical quartz probe of radius 0.48 mm was used. The load on the probe was 100 g and the heating rate was 10° C./min. The samples were kept under a 20 ml/min helium purge. The softening point was taken to be the temperature at which the probe penetrated the sample by 0.1 mm.

The following table lists the quantities (in parts by weight) of prepolymer and DETDA chain extender used in Examples 1-7, as well as the TMA results for the polyurethane panels prepared.

TABLE

| Example | Prepolymer | Quantity of Prepolymer (parts by wt.) | Quantity of DETDA (parts by wt.) | TMA Temperature (°C.) of Panel |
|---|---|---|---|---|
| 1 | A | 562 | 100 | 233 |
| 2 | B | 859 | 100 | 220 |
| 3 | C | 521 | 100 | 229 |
| 4 | D | 535 | 100 | 250 |
| 5 | E | 610 | 100 | 230 |
| 6 | F | 537 | 100 | 143 |
| 7 | G | 753 | 100 | 210 |

EXAMPLE 8

Comparison

The RIM process was performed according to the method of Examples 1-7 using 274 parts by weight Prepolymer H and 100 parts by weight DETDA. The reaction product was a brittle material which, upon opening the mold, was obtained as fragmented pieces. Prepolymer H was unsuitable for RIM processing under the conditions used in the process of the invention.

What is claimed is:

1. A process for the preparation of polyureapolyurethane elastomers comprising reacting in a closed mold in accordance with the reaction injection molding technique at an isocyanate index of about 95 to 110
   (a) an isocyanate prepolymer having an isocyanate content of about 4 wt. % to about 10 wt. % and having a molecular weight range of about 1000 to about 4000, wherein said isocyanate prepolymer is a reaction product of
      (i) at least one organic polyisocyanate with
      (ii) at least one hydroxyl-group-containing compound having a molecular weight range of about 750 to about 3500, wherein said hydroxyl-group-containing compound contains (A) at least two hydroxyl groups or (B) at least one hydroxyl group and at least one primary or secondary amino group; with
   (b) at least one diamine chain extender having no isocyanate-reactive groups other than amino groups,
in the substantial absence of compounds having isocyanate-reactive groups other than amino groups.

2. A process according to claim 1 wherein the diamine chain extender is an aromatic diamine.

3. A process according to claim 2 wherein the aromatic diamine chain extender has at least one $C_1$-$C_3$ alkyl substituent located ortho to one of the amino groups and two $C_1$-$C_3$ alkyl substituents located ortho to the other amino group.

4. A process according to claim 2 wherein the aromatic diamine chain extender is 1-methyl-3,5-diethyl-2,4-diaminobenzene.

5. A process according to claim 2 wherein the aromatic diamine chain extender is a mixture of 1-methyl-3,5-diethyl-2,4-dimainobenzene with 1-methyl-3,5-diethyl-2,6-diaminobenzene.

6. A process according to claim 1 wherein the organic polyisocyanate (i) is a methylene bis(phenylisocyanate).

7. A process according to claim 1 wherein component (ii) is a hydroxyl-group-containing compound containing at least two hydroxyl groups.

8. A process according to claim 1 wherein component (ii) is a polyoxyalkylene polyether polyol.

9. A process according to claim 1 wherein component (ii) is a polytetramethylene diol.

10. A process according to claim 1 wherein component (ii) is a polyester of a dicarboxylic acid and a diol or a mixture of two diols.

11. A process according to claim 10 wherein the dicarboxylic acid is adipic acid.

12. A process according to claim 1 for the preparation of polyurea-polyurethane elastomers comprising reacting in a closed mold in accordance with the reaction injection molding technique at an isocyanate index of about 95 to about 110
   (a) an isocyanate prepolymer having an isocyanate content of about 4 wt. % to about 10 wt. % and having a molecular weight range of about 1000 to about 4000, wherein said isocyanate prepolymer is a reaction product of
      (i) a methylene bis(phenylisocyanate) with
      (ii) a hydroxyl-group-containing compound having a molecular weight range of about 750 to about 3500, wherein said hydroxyl-group-containing compound is a polytetramethylene diol or a polyester of adipic acid and a diol or a mixture of two diols; with
   (b) 1-methyl-3,5-diethyl-2,4-diaminobenzene or a mixture of 1-methyl-3,5-diethyl-2,4-diaminobenzene with 1-methyl-3,5-diethyl-2,6-diaminobenzene,
in the substantial absence of compounds having isocyanate-reactive groups other than amino groups.

13. A process according to claim 1 furhter comprising as an additional component
   (c) an amine terminated polyether containing essentially no hydroxyl groups or other isocyanate reactive groups other than amino groups.

14. A process according to claim 1 wherein the reaction of components (a) and (b) is performed in the presence of (d) one or more auxiliaries or additives.

15. A process according to claim 13 wherein the reaction of components (a), (b), and (c) is performed in the presence of
   (d) one or more auxiliaries or additives.

16. A process according to claim 1 for the preparation of polyurea-polyurethane elastomers comprising reacting in a closed mold in accordance with the reaction injection molding technique at an isocyanate index of about 95 to about 110
   (a) an isocyanate prepolymer having an isocyanate content of about 4 wt. % to about 10 wt. % and having a molecular weight range of about 1000 to about 4000, wherein said isocyanate prepolymer is a reaction product of
      (i) at least one organic polyisocyanate with
      (ii) at least one hydroxyl-group-containing compound having a molecular weight range of about 750 to about 3500, wherein said hydroxyl-group-containing compound contains (A) at least two hydroxyl groups or (B) at least one hydroxyl group and at least one primary or secondary amino group; with
   (b) at least one aromatic diamine chain extender having no isocyanate-reactive groups other than amino groups, and
   (c) an amine terminated polyether containing essentially no hydroxyl groups or other isocyanate reactive groups other than amino groups,
in the presence of
   (d) one or more auxiliaries or additives,
in the substantial absence of compounds having isocyanate-reactive groups other than amino groups.

17. A polyurea-polyurethane elastomer prepared according to the process of claim 1.

18. A polyurea-polyurethane elastomer prepared according to the process of claim 2.

19. A polyurea-polyurethane elastomer prepared according to the process of claim 12.

20. A polyurea-polyurethane elastomer prepared according to the process of claim 16.

* * * * *